(12) United States Patent
Smith et al.

(10) Patent No.: US 7,697,150 B2
(45) Date of Patent: Apr. 13, 2010

(54) LOCKING MECHANISM FOR PRINTER PAPER HANDLING DEVICE

(75) Inventors: Brett Smith, Boise, ID (US); Andrew Alegria, Nampa, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1983 days.

(21) Appl. No.: 10/405,562

(22) Filed: Apr. 2, 2003

(65) Prior Publication Data

US 2004/0196487 A1 Oct. 7, 2004

(51) Int. Cl.
*G06K 15/00* (2006.01)
*B65H 3/16* (2006.01)
(52) U.S. Cl. .................................. 358/1.14; 271/18
(58) Field of Classification Search ............... 358/1.14, 358/1.15, 1.1, 1.13, 1.6; 235/15; 340/5.5; 271/8.1, 278, 3.17, 4.04, 18; 399/110
See application file for complete search history.

(56) References Cited

U.S. PATENT DOCUMENTS

| | | | |
|---|---|---|---|
| 5,297,376 A * | 3/1994 | Taguchi et al. ................. 53/504 |
| 5,390,910 A * | 2/1995 | Mandel et al. ............... 271/296 |
| 5,653,438 A * | 8/1997 | Crowley et al. .............. 271/225 |
| 5,752,697 A * | 5/1998 | Mandel et al. ............... 271/288 |
| 5,774,058 A * | 6/1998 | Henry et al. .................. 340/5.5 |
| 5,816,081 A | 10/1998 | Johnston |
| 6,097,306 A | 8/2000 | Leon et al. |
| 6,308,027 B1 * | 10/2001 | Obu et al. .................... 399/110 |
| 6,439,454 B1 * | 8/2002 | Masson et al. ............... 235/375 |
| 2002/0118382 A1 * | 8/2002 | Jackelen ..................... 358/1.13 |
| 2003/0231103 A1 * | 12/2003 | Fisher ........................ 340/5.73 |
| 2004/0050930 A1 * | 3/2004 | Rowe .......................... 235/380 |

* cited by examiner

*Primary Examiner*—Jerome Grant, II

(57) ABSTRACT

Representative embodiments provide for a security lock apparatus configured to securely couple a sheet handling device in cooperative relationship with an imaging device in response to a first predefined user action, the security lock apparatus further configured to de-couple the sheet handling device from the imaging device in response to a second predefined user action, wherein the security lock apparatus is further configured to be inoperable by unauthorized personnel. The present invention provides a method including supporting a security lock apparatus with an imaging device, performing an authorized predefined locking action coupled to the security lock apparatus, and securely coupling the sheet handling device in cooperative relationship with the imaging device using the lock apparatus in response to the performing the authorized locking action.

25 Claims, 5 Drawing Sheets

LOCKING MECHANISM FOR PRINTER PAPER HANDLING DEVICE

BACKGROUND

Various kinds of imaging apparatus are known in the art. Typically, such an imaging apparatus includes an imaging device that can selectively form images on sheet media (paper, transparencies, etc.) in response to a corresponding electronic document file, generally known as a print job. An imaging device of this kind can be defined, for example, by a laser printer, an inkjet printer, a thermal imaging device, etc.

Furthermore, it is known to couple the imaging device of such an imaging apparatus with a sheet handling device (i.e., paper handler), so that various handling operations can be selectively performed on the sheet media after the formation of images thereon. Such handling operations can include, for example, stapling a number of imaged sheets together a single document, punching holes in the imaged sheet media so that such may be stored in a ring binder, etc. Imaging apparatuses of this general kind can be constructed through the coupling of functional modules (i.e., an imaging device and a sheet handling device), and can therefore be considered as modular imaging apparatuses.

In some usage environments, a number of similar modular imaging apparatuses are in use. On occasion, an imaging module (for example, a laser printer) can malfunction, thereby rendering an entire particular modular imaging apparatus unusable, despite the fact that the associated sheet handling module is still functional. Under such a circumstance, technically unfamiliar or otherwise unauthorized personnel can attempt to remove the still-functional sheet handler from the malfunctioning printer, and to re-couple it with another functional (or presumed functional) imaging module. This type of unauthorized module swapping or "mix-and-match" operation can result in damage to one or more imaging apparatus modules, including modules that were previously functioning normally. Other similar situations and related problems can also occur.

Therefore, it is desirable to provide apparatuses and methods of use that address the problems described above.

SUMMARY

One embodiment provides for a security lock apparatus configured to securely couple a sheet handling device in cooperative relationship with an imaging device in response to a first predefined user action. The security lock apparatus is further configured to de-couple the sheet handling device from the imaging device in response to a second predefined user action, wherein the security lock apparatus is further configured to be inoperable by unauthorized personnel.

Another embodiment provides for an imaging apparatus which includes an imaging device configured to selectively form images on sheet media, and a sheet handling device configured to selectively perform at least one sheet handling operation on sheet media. The imaging apparatus also includes a security lock apparatus configured to securely couple the sheet handling device in cooperative relationship with the imaging device in response to a first predefined user action. The lock apparatus is further configured to de-couple the sheet handling device from the imaging device in response to a second predefined user action. Also, the security lock apparatus is further configured to be inoperable by unauthorized personnel.

Still another embodiment provides for an imaging apparatus which includes an imaging device configured to selectively form images on a sheet media, and a sheet handling device configured to receive imaged sheet media from the imaging device. The sheet handling device is further configured to selectively perform at least one sheet handling operation on the imaged sheet media. The imaging apparatus also includes a user interface and a security lock apparatus. The security lock apparatus is coupled in signal communication with the user interface and supported by the imaging device. The security lock apparatus is configured to securely couple the sheet handling device in cooperative relationship with the imaging device in response to a first predefined password entered into the user interface. The security lock apparatus is further configured to de-couple the sheet handling device from the imaging device in response to a second predefined password entered into the user interface. The security lock apparatus is further configured to be inoperable by unauthorized personnel.

Yet another embodiment provides for a method a of using an imaging apparatus including a sheet handling device and an imaging device. The method includes supporting a security lock apparatus with the imaging device, performing an authorized predefined locking action coupled to the security lock apparatus, and securely coupling the sheet handling device in cooperative relationship with the imaging device using the lock apparatus in response to the performing of the authorized locking action.

These and other aspects and embodiments will now be described in detail with reference to the accompanying drawings, wherein:

DETAILED DESCRIPTION

In representative embodiments, the present teachings provide methods and apparatus for securely mechanically coupling a sheet hander with an associated imaging device such that they are not separable by unauthorized persons.

Figure 1:
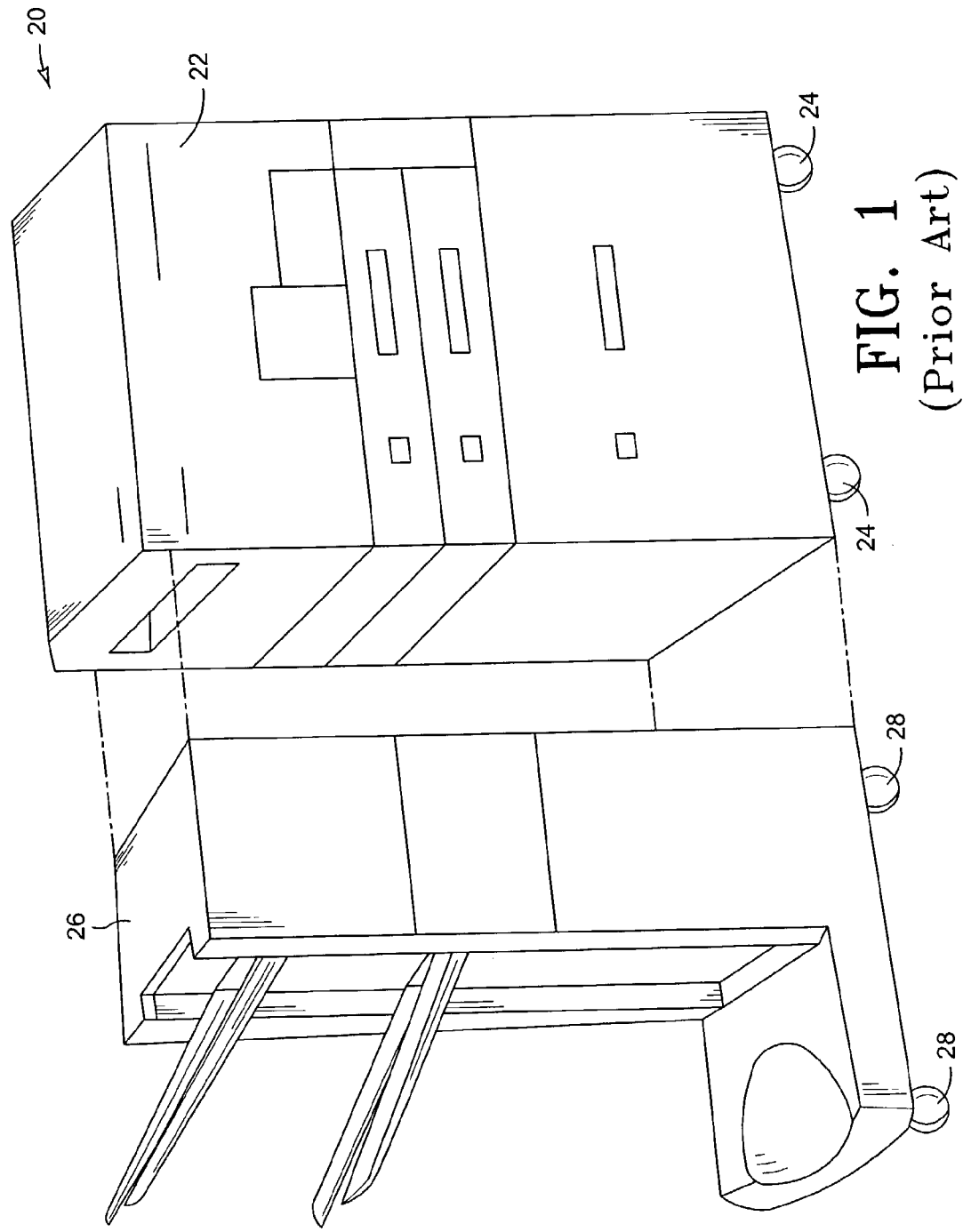
FIG. 1 is a perspective view depicting an exemplary imaging apparatus in accordance with the prior art.

Turning now to FIG. 1, an exemplary imaging apparatus 20 in accordance with the prior art is depicted in a perspective view. The imaging apparatus 20 includes an imaging device, or printer, 22. The printer 22 is configured to selectively form images on sheet media in correspondence to an electronic document file (i.e., a print job) provided to the printer 22 by way of a suitably coupled user computer (not shown). As depicted in FIG. 1, the printer 22 is a laser printer. The printer 22 includes a plurality of rollers 24 that permit the printer 22 to be readily moved about a usage environment, such as an office.

The imaging apparatus 20 also includes a sheet handler, or finishing device, 26. The sheet handler 26 is configured to be coupled in cooperative relationship with the printer 22, and to selectively perform one or more sheet handling or finishing operations on imaged sheet media received from the printer 22, in correspondence to the print job being processed by the printer 22. Non-limiting examples of such handling operations including stapling sheets of media together to define a single document, punching holes into sheet media such that they can be stored in a ring-type binder, collating sheets of media into different output trays as discrete documents, etc. The sheet handler 26 further includes a plurality of rollers 28 that permit the sheet handler 26 to be moved about a usage environment, alone or in tandem with the printer 22.

The imaging apparatus 20 is defined such that an unauthorized user or users can readily remove (i.e., disassociate, or de-couple) the sheet handler 26 from the printer 22. An unauthorized removal operation of this kind can result in the problems described above. The instant invention, described in detail hereafter, substantially negates the problems associated with such unauthorized operations.

Figure 2:
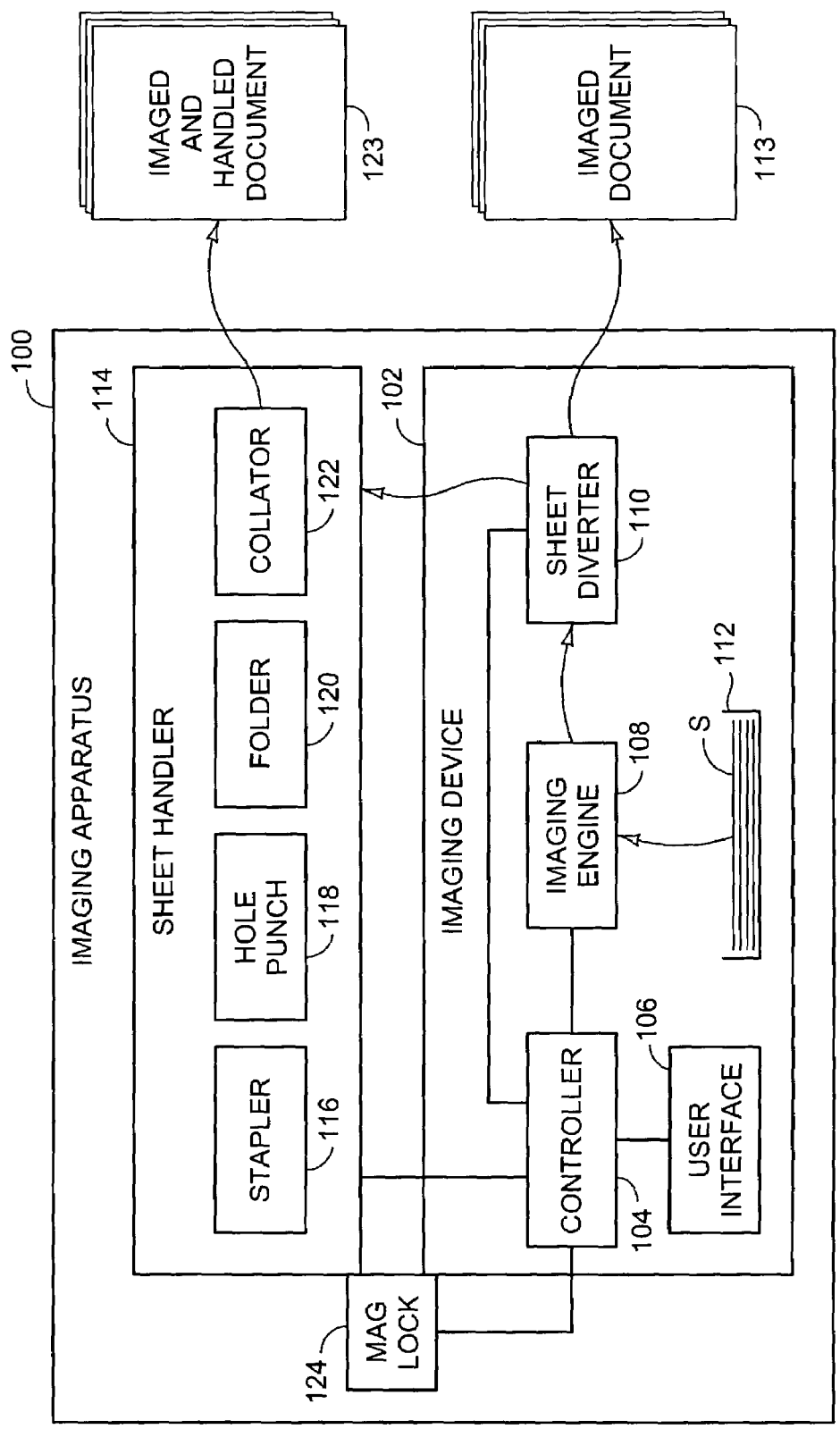
FIG. 2 is a block diagram depicting an imaging apparatus in accordance with an embodiment of the present invention.

FIG. 2 is a block diagram depicting an imaging apparatus 100 in accordance with an embodiment of the present invention. The imaging apparatus 100 includes an imaging device 102. The imaging device 102 can be defined by any suitable apparatus configured to selectively form images on sheet media. Non-limiting examples of the imaging device 102 include a laser printer, an inkjet printer, a thermal imaging device, etc. The imaging device 102 includes a controller 104. The controller 104 can be any control device usable to control typical normal operations of the imaging device 102. The controller 104 can include, for example, a microprocessor, a microcontroller, a state machine, and/or any other suitable electronic circuitry (not shown, respectively). One of skill in the imaging control arts can appreciate that the controller 104 can be suitably configured and employed in a number of different forms within the imagine device 102, and that further specific elaboration is not required for purposes herein.

The imaging device 102 also includes a user interface 106, coupled in signal communication with the controller 104. The user interface 106 can include an electronic display, a number of pushbuttons, a keypad, a touch-sensitive display, an audible tone generator, or any combination of these or other suitable visible, audible, and/or user-operable control elements (not shown). The user interface 106 is generally configured to facilitate the communication of operating commands, parameter selections, visible and/or audible status indications, etc., between the imaging apparatus 100 and a user.

The imaging device 102 further includes an imaging engine 108. The imaging engine 108 is coupled in control signal communication with the controller 104. The imaging engine 108 can be defined by any suitable device usable to selectively form images on sheet media (such as, for example, paper or transparencies, etc.), under the control of the controller 104, typically in correspondence to an electronic document file (i.e., a print job; not shown) provided to the imaging apparatus 100 by a user. As described above, the imaging engine 108 can be defined by a laser imaging engine, an inkjet imaging engine, a thermal imager, and so on.

The imaging device 102 also includes a sheet diverter 110. The sheet diverter 110 is coupled in control signal communication with the controller 104. The sheet diverter 110 can be any suitable device or arrangement configured to receive sheet media from the imaging engine 108 and to selectively route the sheet media to an output location or to a sheet handler 114 (i.e., sheet handling or sheet finishing device) described hereafter, in response to control signals issued to the sheet diverter 110 by the controller 104.

The imaging apparatus 100 also includes the sheet handler 114 introduced above. The sheet handler 114 is coupled in control signal communication with the controller 104 and sheet media-receiving cooperation with the sheet diverter 110 of the imaging device 102. As depicted in FIG. 2, the sheet handler 114 includes a stapler 116, a hole punch 118, a folder 120, and a collator 122, each of which is selectively usable, alone or in suitable combination with the other devices (116-122) of the sheet handler 114, to perform one or more sheet handling tasks (functions) on imaged sheet media received by the sheet handler 114 from the imaging device 102. In another embodiment (not shown), the sheet handler 114 can include other sheet handling or finishing devices such as document scanner, which can include an automatic document feeder. The sheet handler 114 is generally defined by any suitable selection or combination of sheet media handling devices (i.e., 116-122) that can be selectively applied to sheet media under the control of the controller 104 of the imaging device 102.

It is to be further understood that the imaging apparatus 100 can also include other elements or devices as required for typical operation. Such elements or devices can include, for example, a power supply, sheet media transport and routing mechanisms, cooling fans, etc. One of skill in the imaging or related arts can appreciate that such elements or devices can be included and cooperatively configured as desired within the imaging apparatus 100, and that further elaboration is not required for an understanding of the present invention.

The imaging apparatus 100 further includes a security lock apparatus 124 (hereafter, lock apparatus). The lock apparatus 124 is coupled in signal communication with the user interface 106, by way of the controller 104 of the imaging device 102. The lock apparatus 124 is generally supported by the imaging device 102. In another embodiment, the lock apparatus 124 is generally supported by the sheet handler 114. As depicted in FIG. 2, the lock apparatus 124 is understood to include an electromagnetic locking device. For purposes herein, an electromagnetic locking device (or apparatus) can be generally defined by any suitable electrically actuated device including, for example, a solenoid, an electromagnetic latch, or any other suitable device configured to convert electrical energy into direct or induced rotational and/or linear mechanical motion by way of a magnetic field. Other embodiments (not shown) of the lock apparatus 124 can also be used, as described further below.

In any case, the lock apparatus 124 is configured to securely mechanically engage both the sheet handler 114 and the imaging device 102, thereby securely coupling the sheet handler 114 in cooperative relationship with the imaging device 102, in response to the entering of a first predefined password (i.e., a "lock" password or command) into the user interface 106 by an authorized user. The lock apparatus 124 is further configured to securely mechanically disengage from one or both of the sheet handler 114 and the imaging device 102, thereby removing (i.e., de-coupling) the secure coupling of the sheet handler 114 with the imaging device 102, in response to the entering of a second predefined password (i.e., an "unlock" password or command) into the user interface 106 by an authorized user.

Thus, the lock apparatus 124 can be generally defined as having two operative states: a first or locked state, in which the sheet handler 114 is restrained from being physically separated or disassociated from the imaging device 102; and a second or unlocked state, in which the sheet handler 114 is enabled to be physically separated (disassociated) from the imaging device 102. These two operative states of the lock apparatus 124 are respectively assumed in response to the entry of a corresponding password (or command) into the user interface 106 of the imaging device 102. Furthermore, the lock apparatus 124 can be configured such that the first and second predefined passwords are selectively changeable from time-to-time by an authorized user, typically in the interests of ongoing security.

The lock apparatus 124 is configured to ensure that a particular sheet handler 114 is not removed or dissociated from a corresponding imaging device 102 by an unauthorized person or persons—that is, someone unaware of the predefined unlock password. In this way, it is possible to selectively determine and/or manage those persons who are authorized to operate the lock apparatus 124 within a given usage environment.

Typical operation of the imaging apparatus 100 is as follows: The sheet handler 114 is coupled in electrical, control signal, and sheet media-receiving cooperation with the imaging device 102, as desired. As a result, the sheet handler 114 is in generally close proximity, or direct contact, with the imaging device 102. It is assumed at this point that the lock apparatus 124 is supported by the imaging device 102 (or optionally, the sheet handler 114), and is poised to securely mechanically engage both the imaging device 102 and the sheet handler 114.

Next, the first predefined (lock) password is then entered into the user interface 106 of the imaging device 102. In response to the first password entry, the controller 104 causes the lock apparatus 124 to securely mechanically engage both the imaging device 102 and the sheet handler 114. Such secure engagement by the lock apparatus 124 can include any one or more of the following (not shown): The secure locking of a steel cable arrangement that has been suitably threaded through corresponding aspects of the imaging device 102 and the sheet handler 114; the extension and/or rotation of one or more locking bolts from the lock apparatus 124 into corresponding receivers of the imaging device 102 and the sheet handler 114; the secure grasping of electrical or signal cabling coupling the imaging device 102 with the sheet handler 114; etc. Any suitable secure mechanical engagement of the lock apparatus 124 with both the imaging device 102 and the sheet handler 114, or any respective elements thereof, can be used. In one example, an electrically actuated solenoid (under control of the controller 104) can be used to move a locking bolt into the "lock" position, and to retract the bolt to the "unlock" position.

Thereafter, an electronic document file (i.e., print job) is provided to the imaging apparatus 100 by way of a user computer (not shown) suitably coupled thereto. The controller 104 then causes sheet media S to drawn from an input tray 112, one sheet at a time, and routed to the imaging engine 108, where images are selectively formed thereon under the control of the controller 104 in correspondence to the print job. The controller 104 then causes the imaged sheet media to be routed from the imaging engine 108 to the sheet diverter 110, where it is routed to one of an output location or the sheet handler 114, in correspondence to the print job.

In a case where no sheet handling is required by the sheet handler 114, the imaged sheets of media are routed from the sheet diverter 110 out of the imagined device 102 and accumulate to define an imaged document 113. In another case where one or more sheet handling operations are required by the print job, the controller 104 causes the imaged sheet media to be routed from the sheet diverter 110 to the sheet handler 114 where such handling operation or operations are performed. The imaged and handled sheet media are then issued from the sheet handler 114 and accumulate to define an imaged and handled document 123. The imaging and optional handling operations described above can be generally repeated, on a per-print job basis, as desired. Furthermore, unauthorized persons are restrained from removing or disassociating the sheet handler 114 from the imaging device 102 during this period of secure engagement (coupling) there between.

If there comes a time when it is desirable for an authorized person or persons to separate the sheet handler 114 from the imaging device 102, an authorized person enters the second predefined (unlock) password into the user interface 106. In response to this second password entry, the lock apparatus 124 ceases its secure mechanical engagement (i.e., secure coupling) from one or both of the imaging device 102 and the sheet handler 114, thus permitting an authorized person or persons to suitably remove or disassociate the sheet handler 114 from the imaging device 102, as desired.

It will be appreciated that the first predefined password and the second predefined password can be the same password. For example, the password can be a four digit number, and the controller can be configured to determine the present state of the lock device, and to cycle the lock device to the opposite state upon receipt of the password.

It is to be understood that the lock apparatus 124 can respond to a third predefined password which disables the lock apparatus 124 indefinitely (i.e., places the lock apparatus 124 into an "unused" or "deep-sleep" mode of operation), until normal operation of the lock apparatus 124 is desired through the use of the first and second predefined passwords. This "unused" mode of operation is desirable in some usage environments where the need to securely mechanically engage a sheet handler to its associated imaging device is not a concern, but avoidance of the use of passwords in servicing an imaging apparatus that includes the lock apparatus 124 is desired.

It will be further appreciated that, although FIG. 2 depicts the imaging device 102 as being a printing device, the imaging device can also be a photocopying device, or a combination imaging device capable of generating printed copies from remotely transmitted files, or photocopies based on local original copies (e.g., from a document scanner).

Figure 3:
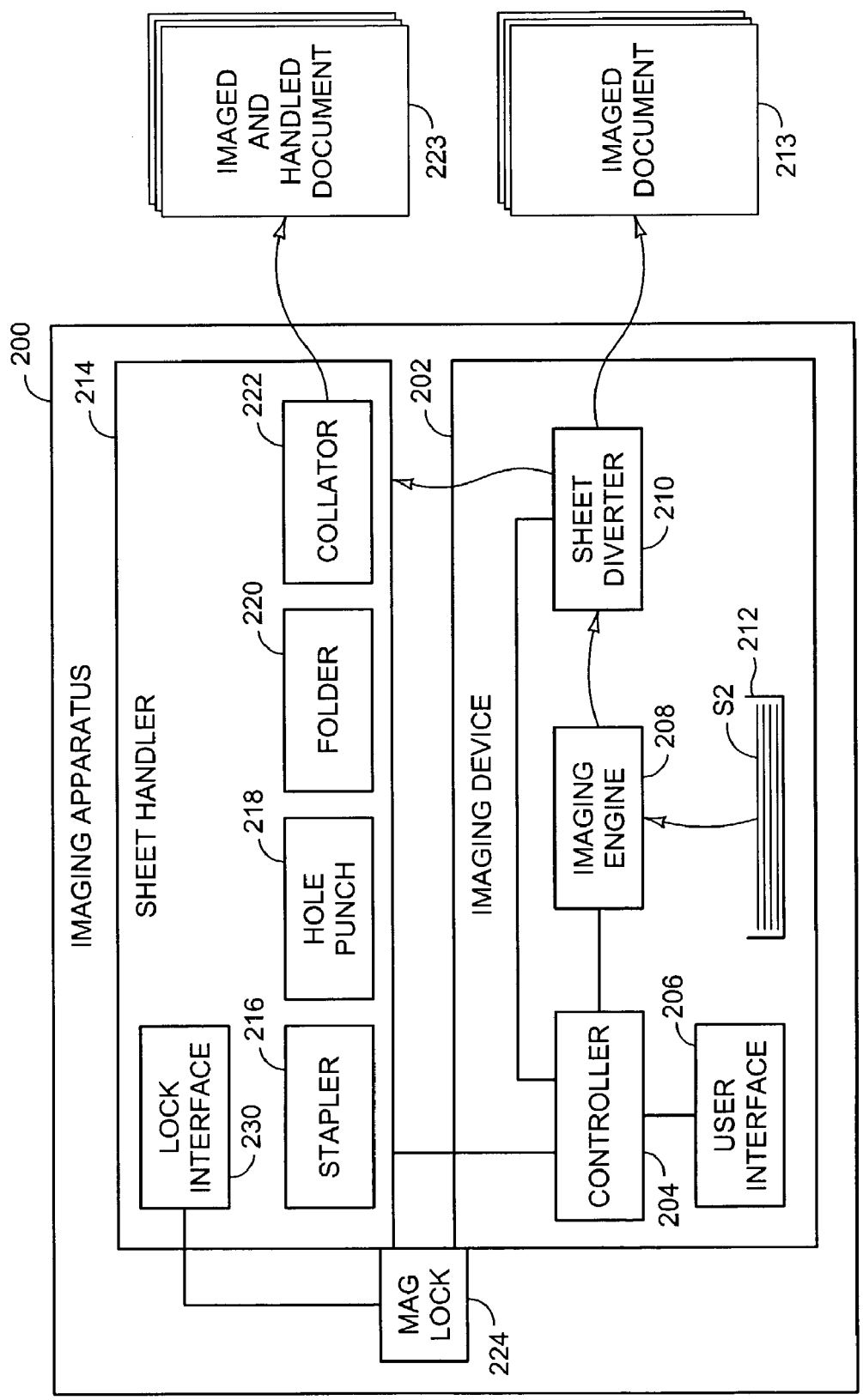
FIG. 3 is a block diagram depicting an imaging apparatus in accordance with another embodiment of the present invention.

FIG. 3 is a block diagram depicting an imaging apparatus 200 in accordance with another embodiment of the present invention. The imaging apparatus 200 includes an imaging device 202. The imaging device 202 includes a controller 204, a user interface 206, an imaging engine 208, a sheet diverter 210, and an input tray 212, which are defined, configured, and cooperative substantially as described above in regard to the controller 104, the user interface 106, the imaging engine 108, the sheet diverter 110, and the input tray 112, respectively, of the imaging device 102 of FIG. 2.

The imaging apparatus 200 also includes a sheet handler 214. The sheet handler 214 includes a stapler 216, a hole punch 218, a folder 220, and a collator 222, which are defined, configured, and cooperative substantially as described above in regard to the stapler 116, the hole punch 118, the folder 120, and the collator 122, respectively, of the sheet handler 114 of FIG. 2. The imaging apparatus 200 is therefore generally configured to use the imaging device 202 and the sheet handler 214 to perform selective imaging and sheet handling tasks, respectively, on a sheet media S2 in correspondence to a print job (not shown), resulting in an imaged document 213 and/or an imaged and handled document 223.

The imaging apparatus 200 also includes a security lock apparatus 224 (hereafter, lock apparatus). As depicted in FIG. 3, the lock apparatus 224 is understood to include an electromagnetic locking apparatus. The lock apparatus 224 is coupled in signal communication with a corresponding lock interface 230. As depicted, the lock interface 230 and the lock apparatus 224 are supported by the sheet handler 214. In another embodiment (not shown), the lock interface 230 is supported by the lock apparatus 224. The lock interface 230 includes a keypad, a number of pushbuttons, an electronic display, or any combination of these or other elements as desired, which are configured to facilitate the use of the lock apparatus 224 by an authorized user.

The lock apparatus 224 is defined, configured, and cooperative generally as described above in regard to the lock apparatus 124 of the imaging apparatus 100 of FIG. 2. In this way, the lock apparatus 224 is configured to securely mechanically engage both the sheet handler 214 and the imaging device 202, thereby securely coupling the sheet handler 214 in cooperative relationship with the imagine device 202, in response to the entry of a first predefined (lock) password into the lock interface 230 by an authorized user. Accordingly, the lock apparatus 224 is also configured to securely mechanically disengage from one or both of the sheet handler 214 and the imaging device 202, thereby removing (i.e., de-coupling) the secure coupling of the sheet handler 114 with the imaging device 102, in response to the entering of a second predefined password (i.e., an "unlock" password or command) into the lock interface 230 by an authorized user.

Therefore, the lock apparatus 224 can be defined as including two operative states (i.e., locked and unlocked), substantially as described above in regard to the lock apparatus 124 of the imaging apparatus 100 of FIG. 2. Furthermore, the lock apparatus 224 is configured to ensure that the sheet handler 214 cannot be removed or disassociated from the imaging device 202 by an unauthorized user.

Figure 4:
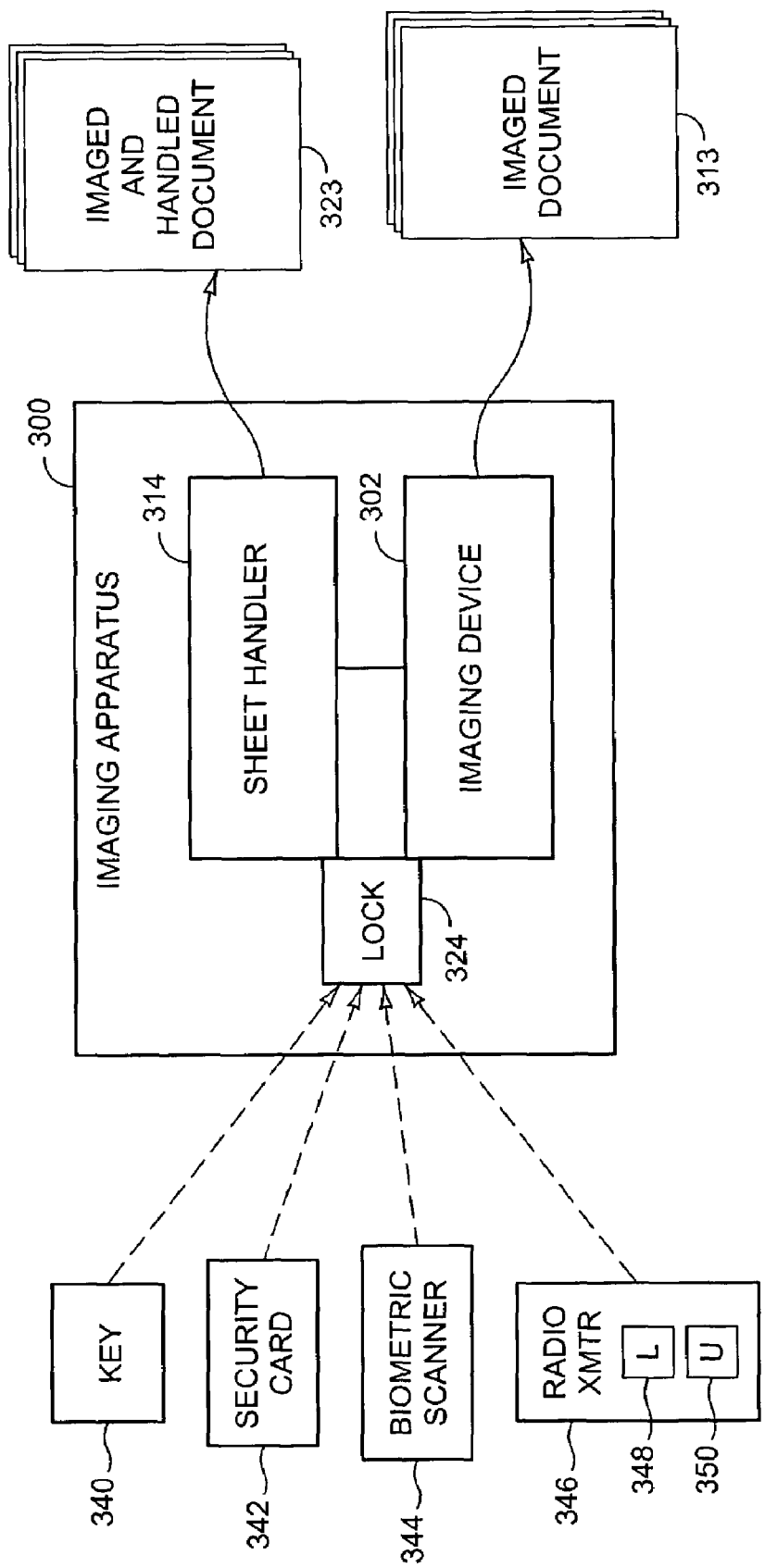
FIG. 4 is block diagram depicting an imaging apparatus in accordance with still another embodiment of the present invention.

FIG. 4 is a block diagram depicting an imaging apparatus 300 in accordance with still another embodiment of the present invention. The imaging apparatus 300 includes an imaging device 302 and a sheet handler 314, which are defined, configured, and cooperative substantially as described above in regard to the imaging apparatus 102 and the sheet handler 114, respectively, of the imaging apparatus 100 of FIG. 2. As such, the imaging device 302 and the sheet handler 314 are usable by the imaging apparatus 300 to selectively image and handle sheet media, respectively, in correspondence to a print job (not shown), resulting in an imaged document 313 and/or an imaged and handled document 323.

The imaging apparatus 300 further includes a security lock apparatus 324 (hereafter, lock apparatus). The lock apparatus 324 is configured to securely mechanically engage both the sheet handler 314 and the imaging device 302, thereby securely coupling the sheet handler 314 in cooperative relationship with the imaging device 302, in response to a first predefined user action (described hereafter). The lock apparatus 324 is further configured to securely mechanically disengage from one or both of the sheet handler 314 and the imaging device 302, thereby removing (i.e., de-coupling) the secure coupling of the sheet handler 314 with the imaging device 302, in response to a second predefined user action (described hereafter). Therefore, the lock apparatus 324 can be defined as including locked and unlock operative states substantially as described above in regard to the lock apparatus 124 of FIG. 2.

The particular form of the respective first and second user actions is dependent upon the particular embodiment of the lock apparatus 324. In one embodiment, the lock apparatus 324 is configured to selectively assume the locked or unlocked states in response to use of a corresponding key 340. The key 340 can be defined by any suitable, substantially conventional mechanical key known in the related arts. In such an embodiment, the lock apparatus 324 is also substantially mechanical in its overall form, and the first and second predefined user actions respectively include use of the key 340. In one variation the key 340 can be replaced with a combination lock mechanism (not shown) which is built into the lock apparatus 324.

In another embodiment, the lock apparatus 324 is configured to selectively assume the locked or unlocked states in response to use of a corresponding security card 342. The security card 342 can be defined by a proximity card, a magnetic strip card, an optical barcode card, or any other suitable security card form. In such an embodiment, the lock apparatus 342 is coupled in signal communication to a corresponding card reader or scanner device (not shown) usable with the security card 342. Therefore, in such an embodiment, the first and second predefined user actions respectively include use (i.e., scanning or reading) of the security card 342.

In yet another embodiment, the lock apparatus 324 is configured to selectively assume the locked or unlocked states in response to scanning a human anatomical feature using a biometric scanner 344, coupled in signal communication to the lock apparatus 324. The biometric scanner 344 can be defined by a retinal scanner, a thumbprint scanner, a fingerprint scanner, or any other suitable biometric scanning device. In such an embodiment, the first and second predefined user actions respectively include scanning a corresponding human anatomical feature using the biometric scanner 344.

In still another embodiment, the lock apparatus 324 is configured to selectively assume the locked or unlocked states in response to receiving a radio frequency (RF) signal, transmitted by a corresponding radio transmitter device 346. The radio transmitter device 346 includes a lock button 348 and an unlock button 350, which are actuated by a user to transmit a "lock" radio frequency signal and an "unlock" radio signal, respectively, from the radio transmitter 346 to the lock apparatus 324. In such an embodiment, the first and second predefined user actions respectively include transmitting the desired radio frequency signal (i.e., lock or unlock) to the lock apparatus 342 using the radio transmitter device 346.

It is to be understood that the various embodiments of the lock apparatus 324 described above are by no means exhaustive of all possible such embodiments anticipated by the present invention. Generally, the lock apparatus 324 can be defined by any suitable lock apparatus that can be used to selectively, securely mechanically engage and disengage (i.e., coupled and de-couple) the sheet handler 314 in cooperative relationship with the imaging device 302, in respective response to any first and second predefined user actions, using any correspondingly required devices or elements.

Figure 5:
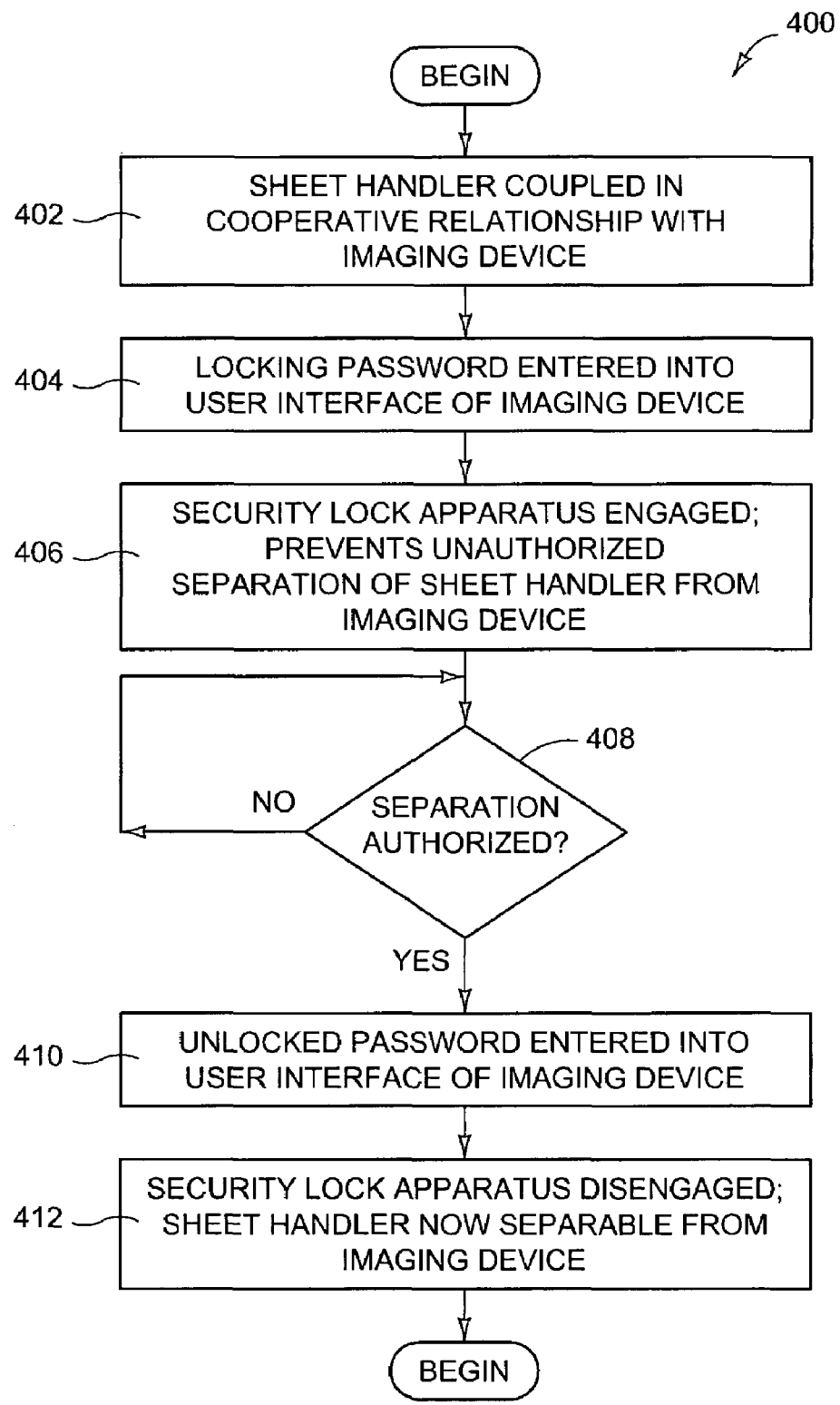
FIG. 5 is a flowchart depicting a method in accordance with one embodiment of the present invention.

FIG. 5 is a flowchart depicting a method 400 in accordance with the present invention. For clarity of understanding, the method 400 is described hereafter in the context of the imaging apparatus 100 of FIG. 2. However, the steps of method 400 are generally conceptually applicable to any embodiment of the present invention, in any suitable order.

In step 402, the sheet handler 114 is arranged (positioned) and coupled in cooperative relationship with the imaging device 102. Such coupling can include electrical, signal, and/or mechanical aspects as required for normal operation of the imaging apparatus 100. In any case, the lock apparatus 124 is coupled in signal communication with the user interface 106.

In step 404, the first predefined (i.e., "lock") password is entered into the user interface 106 of the imaging device 102 by an authorized user.

In step 406, the lock apparatus 124 securely mechanically engages both the sheet handler 114 and the imaging device 102, thus securing the cooperative coupling between the sheet handler 114 and the imaging device 102. The lock apparatus 124 has assumed the locked operative state. Such engagement (secure coupling) prevents unauthorized separation (removal or disassociation) of the sheet handler 114 from the imaging device 102. The imaging device 100 is now usable for normal operation.

In step 408, it is determined whether or not there is an authorized need to separate the sheet handler 114 from the imaging device 102. Such an authorized need can be based, for example, on a need or desire to perform service on the imaging apparatus 100, a need or desire to re-associate the sheet handler 114 with another imaging device (not shown), etc. If no such authorized need presently exists, then the method 400 assumes a loop condition in step 408. If an authorized need does exist, then the method 400 proceeds to step 410.

In step 410, the second predefined (i.e., "unlock") password is entered into the user interface 106 by an authorized user.

In step 412, the lock apparatus 124 securely mechanically disengages from one or both of the imaging device 102 and the sheet handler 114, thereby removing (i.e., de-coupling) the secure coupling of the sheet handler 114 from the imaging device 102. The sheet handler 114 can thereafter by removed or disassociated from the imaging device 102 as desired, typically by way of undoing the cooperative relationship established in step 402. The method 400 is now complete.

Although the flow chart of FIG. 5 shows a specific order of execution, the order of execution may differ from that which is depicted. All such variations are within the scope of the present invention.

The present invention can be generally described as follows: A security lock apparatus is configured to selectively, securely couple a sheet handler or finishing device in cooperative relationship with an imaging device, such that an imaging apparatus or multifunction printer is defined. The security lock apparatus is also configured to assume locked and unlocked operative states in response to respective first and second predefined user actions. Each first and second predefined user actions can include, for example: The entry of a corresponding password into user or lock interface coupled to the security lock apparatus; the use of a corresponding mechanical key or combination, a biometric scanner, a security card, or radio transmitter device; etc. The security lock apparatus is further configured to prevent or inhibit unauthorized users (persons) from removing or disassociating a sheet handler securely coupled therewith to an imaging device.

The inventors have discovered that at least the following desirable aspects are associated with use of the security lock apparatus of the present invention:

1) The security lock apparatus prevents theft of a sheet handler (i.e., finishing device) that is associated with an imaging device (i.e., printer).
2) The security lock apparatus prevents unauthorized personnel (users) from switching sheet handlers or imaging devices with those of similar imaging apparatus (prevents mix-and-match operations). This further prevents damage associated with such unauthorized operations.
3) The security lock apparatus ensures that only authorized personnel are able to disassociate a sheet handler from an imaging device during service operations.
4) The security lock apparatus enables usage or information technology managers to monitor and control equipment associations in managed print service or similar environments.
5) The security lock apparatus prevents the unauthorized migration of a sheet handler and/or imaging device between different departments within a managed environment. This ensures ongoing equipment accountability within managed usage environments comprising multiple departments having the same kinds of imaging apparatus.

While the above methods and apparatus have been described in language more or less specific as to structural and methodical features, it is to be understood, however, that they are not limited to the specific features shown and described, since the means herein disclosed comprise preferred forms of putting the invention into effect. The methods and apparatus are, therefore, claimed in any of their forms or modifications within the proper scope of the appended claims appropriately interpreted in accordance with the doctrine of equivalents.

We claim:

1. A security lock apparatus configured to securely couple a sheet handling device in cooperative relationship with an imaging device in response to a first predefined user action, the security lock apparatus further configured to de-couple the sheet handling device from the imaging device in response to a second predefined user action, wherein the security lock apparatus is further configured to be inoperable by unauthorized personnel, and wherein the sheet handling device includes a finishing device configured to apply a finishing process to imaged sheet media received by the sheet handling device from the imaging device after being imaged by the imaging device.

2. The security lock apparatus of claim 1, and wherein the security lock apparatus is further configured such that the first predefined user action and the second predefined user action respectively include entering a password into a user interface coupled in signal communication with the security lock apparatus, and wherein the user interface is supported by the imaging device.

3. The security lock apparatus of claim 1, and wherein the security lock apparatus is further configured such that the first predefined user action and the second predefined user action respectively include entering a password into a lock interface coupled in signal communication with the security lock apparatus, and wherein the lock interface is supported by one of the sheet handling device or the security lock apparatus.

4. The security lock apparatus of claim 1, and wherein the security lock apparatus includes a security card scanner, and wherein the first predefined user action and the second predefined user action respectively include scanning a security card using the security card scanner.

5. The security lock apparatus of claim 1, and wherein the security lock apparatus is further configured such that the first predefined user action and the second predefined user action respectively include transmitting a radio frequency signal to the security lock apparatus using a corresponding radio transmitter device.

6. The security lock apparatus of claim 1, and wherein the security lock apparatus is further configured such that the first predefined user action includes actuating the security lock apparatus using a corresponding key and the second user action includes dc-actuating the security lock apparatus using the corresponding key.

7. The security lock apparatus of claim 1, and wherein the security lock apparatus is lbrther configured such that the first predefined user action and the second predefined user action respectively include scanning a human anatomical feature using a biometric scanner coupled in signal communication with the security lock apparatus.

8. The security lock apparatus of claim 1, and wherein the security lock apparatus is further configured to be supported by the imaging device.

9. The security lock apparatus of claim 1, and wherein the security lock apparatus is further configured to be supported by the sheet handling device.

10. The security lock apparatus of claim 1, and wherein the security lock apparatus is further configured to assume an unused operative state in response to a third predefined user action.

11. Art imaging apparatus, comprising:
an imaging device configured to selectively form images on sheet media;
a sheet handling device configured to selectively perform at least one sheet handling operation on sheet media; and
a security lock apparatus configured to securely couple the sheet handling device in cooperative relationship with the imaging device in response to a first predefined user action, the security lock apparatus further configured to de-couple the sheet handling device from the imaging device in response to a second predefined user action, wherein the security look apparatus is further configured to be inoperable by unauthorized personnel, and wherein the sheet handling device includes a finishing device configured to apply a finishing process to imaged sheet media received by the sheet handling device from the imaging device after being imaged by the imaging device.

12. The imaging apparatus of claim 11, and wherein the security lock apparatus is further configured such that the first predefined user action and the second predefined user action respectively include entering a password into a user interface coupled in signal communication with the security lock apparatus, and wherein the user interface is supported by the imaging device.

13. The imaging apparatus of claim 11, and wherein the security lock apparatus is further configured such that the first predefined user action and the second predefined user action respectively include entering a password into a lock interface coupled in signal communication with the security lock apparatus, and wherein the lock interface is supported by one of the sheet handling device or the security lock apparatus.

14. The imaging apparatus of claim 11, and wherein the security lock apparatus includes a security card scanner, and wherein the first predefined user action and the second predefined user action respectively include scanning a security card using the security card scanner.

15. The imaging apparatus of claim 11, and wherein the security lock apparatus is further configured such that the first predefined user action and the second predefined user action respectively include transmitting a radio frequency signal to the security lock apparatus using a corresponding radio transmitter device.

16. The imaging apparatus of claim 11, and wherein the security lock apparatus is further configured such that the first predefined user action includes actuating the security lock apparatus using a corresponding key and the second user action includes de-actuating the security lock apparatus using the corresponding key.

17. The imaging apparatus of claim 11, and wherein the security lock apparatus is further configured such that the first predefined user action and the second predefined user action respectively include scanning a human anatomical feature using a biometric scanner coupled in signal communication with the security lock apparatus.

18. The imaging apparatus of claim 11, and wherein the security lock apparatus is further configured to be supported by one of the imaging device or the sheet handling device.

19. A method of securing a sheet handling device to an imaging device, comprising:
locking the sheet handling device to the imaging device with a locking apparatus; and
performing an authorized predefined locking action on the locking apparatus, wherein the sheet handling device includes a finishing device configured to apply a finishing process to imaged sheet media received by the sheet handling device from the imaging device after being imaged by the imaging device.

20. The method of claim 19, and further comprising performing an authorized predefined unlocking action on the locking apparatus to thereby permit the de-coupling of the sheet handling device from the imaging device.

21. The method of claim 20, and wherein the authorized predefined locking and unlocking actions comprise entering respective passwords into a user interface.

22. The method of claim 20, and wherein the authorized predefined locking action includes actuating the locking apparatus using a corresponding key, and wherein the authorized predefined unlocking action includes de-actuating the locking apparatus using the corresponding key.

23. The method of claim 20, and wherein the authorized predefined locking action and the authorized predefined unlocking action respectively include scanning a security card using the locking apparatus.

24. The method of claim 20, and wherein the authorized predefined lacking action and the authorized predefined unlocking action respectively include transmitting a radio frequency signal to the locking apparatus.

25. The method of claim 20, and wherein the authorized predefined locking action and the authorized predefined unlocking action respectively include scanning a human anatomical feature using a biometric scanner coupled in signal communication with the locking apparatus.

* * * * *

UNITED STATES PATENT AND TRADEMARK OFFICE
CERTIFICATE OF CORRECTION

PATENT NO. : 7,697,150 B2  Page 1 of 1
APPLICATION NO. : 10/405562
DATED : April 13, 2010
INVENTOR(S) : Brett Smith et al.

It is certified that error appears in the above-identified patent and that said Letters Patent is hereby corrected as shown below:

In column 10, line 57, in Claim 6, delete "dc-actuating" and insert -- de-actuating --, therefor.

In column 10, line 60, in Claim 7, delete "Ibrther" and insert -- further --, therefor.

In column 11, line 8, in Claim 11, delete "Art" and insert -- An --, therefor.

In column 11, line 20, in Claim 11, delete "look" and insert -- lock --, therefor.

In column 12, line 43, in Claim 24, delete "lacking" and insert -- locking --, therefor.

Signed and Sealed this

Tenth Day of August, 2010

David J. Kappos
*Director of the United States Patent and Trademark Office*